No. 806,146. PATENTED DEC. 5, 1905.
E. H. HURRY & H. J. SEAMAN.
PROCESS OF MANUFACTURING PORTLAND CEMENT.
APPLICATION FILED JULY 17, 1900.
2 SHEETS—SHEET 1.
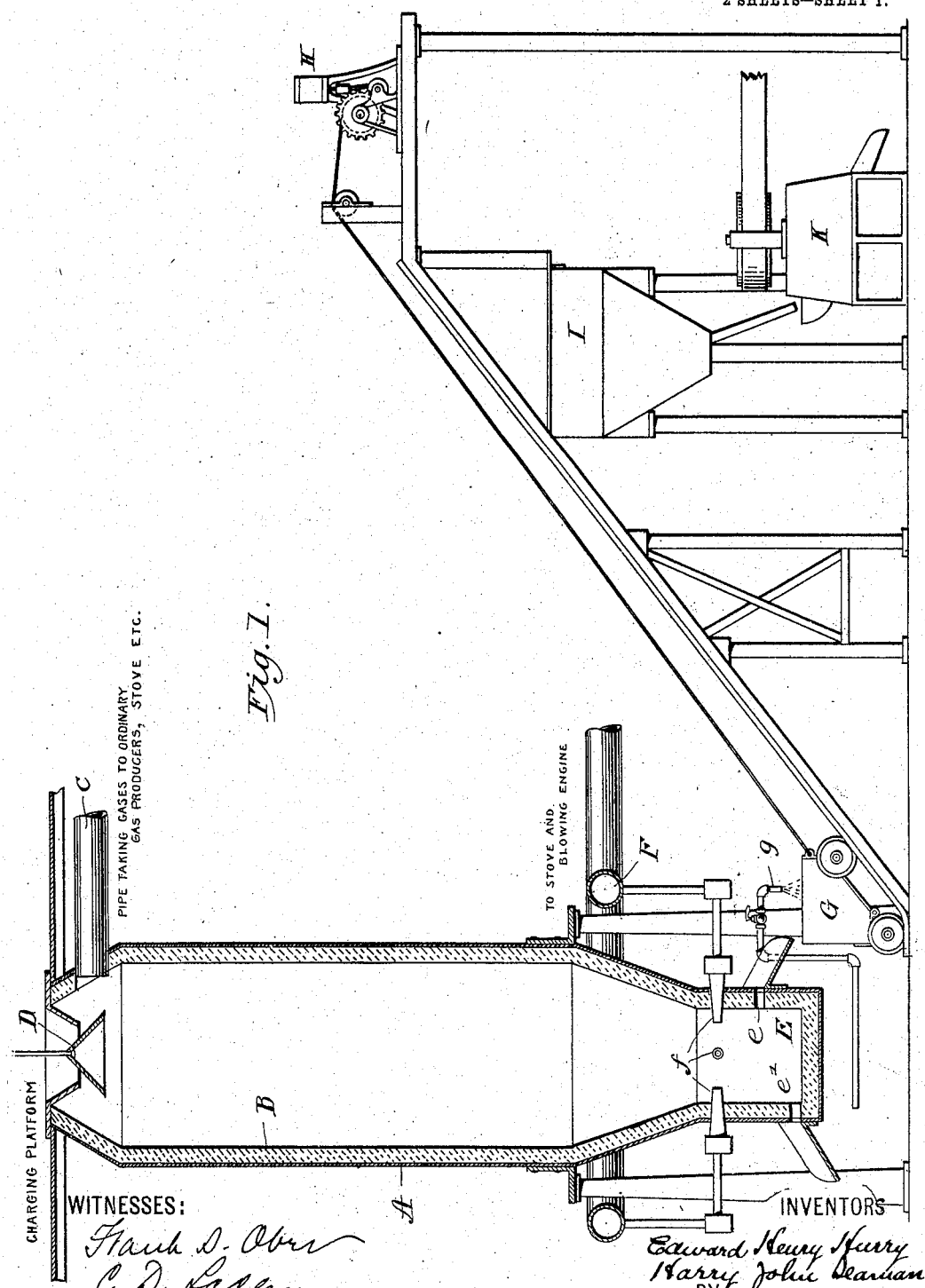

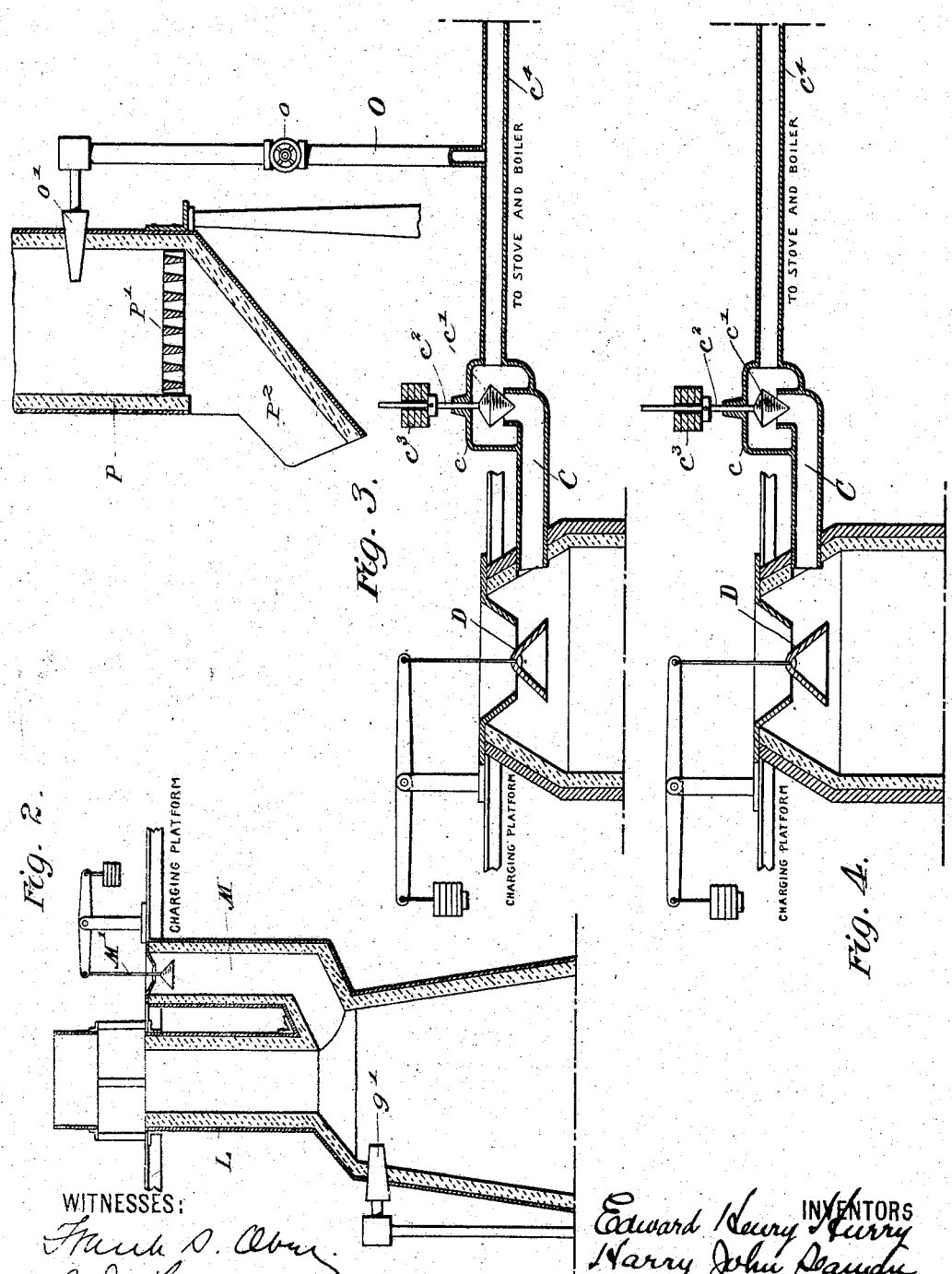

UNITED STATES PATENT OFFICE.

EDWARD HENRY HURRY, OF BETHLEHEM, AND HARRY JOHN SEAMAN, OF CATASAUQUA, PENNSYLVANIA.

PROCESS OF MANUFACTURING PORTLAND CEMENT.

No. 806,146.     Specification of Letters Patent.     Patented Dec. 5, 1905.

Application filed July 17, 1900. Serial No. 23,942.

*To all whom it may concern:*

Be it known that we, EDWARD HENRY HURRY, a subject of the Queen of Great Britain, residing at Bethlehem, in the county of Northampton, and HARRY JOHN SEAMAN, a citizen of the United States, residing at Catasauqua, county of Lehigh, State of Pennsylvania, have jointly invented certain new and useful Improvements in Processes of Manufacturing Portland Cement, of which the following is a specification.

The object of the invention is to decrease the cost of manufacturing Portland cement of high quality.

In manufacturing Portland cement according to the present invention we subject the raw materials containing lime, silica, and alumina to such a temperature while in direct contact with the fuel that the chemical reactions desired between the constituents are obtained and the resulting products fused to liquidity. We prefer to carry on this operation in a reducing atmosphere and under a pressure greater than atmospheric pressure. We find that by this mode of procedure several important advantages are attained.

Nearly all argillaceous materials available for the commercial manufacture of Portland cement contain a varying percentage of iron oxid, which gives the cement manufactured by the processes heretofore in use staining properties often most undesirable. By fusion in a reducing atmosphere this iron oxid can be substantially all reduced to metallic iron and separated by gravity from the molten cement-clinker. The upper portion of the molten mass entirely or substantially free from iron may therefore be tapped off, cooled, and pulverized, the resulting product being Portland cement of high quality and substantially free from iron. The lower portion of the molten mass may be separately drawn off and applied to such uses after further treatment, if desired, as may be expedient.

It is well known that up to a certain limit an increase of the percentage of lime contained in the raw materials and the resulting Portland cement materially increases the strength of such cement; but in the methods of manufacture hitherto in use it has not been commercially possible to push this advantage to its full limit, it being found that when the content of lime in the Portland cement so manufactured exceeds about sixty-two per centum it is very liable after being used to crack, "blow," or disintegrate, such result being due to the presence of lime which has not entered into thorough chemical combination with the other ingredients. By the use of our improved process, however, the percentage of lime may be increased, when the proper ratio exists between the contained silica and alumina, to as high as sixty-seven per cent. without danger of disintegration of the cement after use. The very high temperature used and the very intimate mixing secured by fusion provide conditions so favorable to the attainment of the requisite chemical combinations that the liability of uncombined or loosely-combined lime occurring in the product is minimized.

A practical plan or mode of practicing the invention which we deem most efficient and desirable for various reasons is to introduce the above-named raw materials mixed with carbonaceous fuel at the top or upper part of an upright furnace having a closed bottom or hearth with two tap-holes one above the other, one for drawing off the upper portion of the molten cement material, from which the iron is separated and the lower one for tapping-off the lower portion of the molten mass containing the iron. Blasts of compressed air are introduced in suitable volume in the lower portion of the furnace above the tap-holes, as in ordinary blast-furnace practice, and the resulting high temperature and reducing atmosphere produce the results above stated.

If we mix the fuel and the raw cement materials—namely, carbonate of lime and clay or argillaceous material containing alumina and silica in the natural state in which they come from the quarries (breaking them up into pieces of suitable size)—the carbonate of lime will give up its carbonic acid, which will pass out of the furnace mixed with carbonic oxid and the other gases. Carbonic acid may be thus disassociated from the carbonate of lime, or this may be accomplished by a preliminary roasting of the carbonate of lime, and in either case we are enabled to omit the plan usually heretofore practiced of first reducing the raw materials to the form of a finely-levigated slurry, then drying the slurry and breaking it up or molding the slurry into lumps or bricks, drying them, and then in either case burning them in a kiln, as in one well-known process, or of grinding the dry raw materials together to a fine powder, which is then burned in a rotary furnace according to another well-known mode of operation, or of drying and burning wet slurry in the same operation in a rotary kiln. We may therefore eliminate substantially the whole or the larger part of the cost (both in labor and in plant) of treating the raw materials according to the processes above suggested, which are, so far as we are aware, the only ones by which Portland cement is commercially made.

In practicing our improved process according to the plans above suggested of either preliminarily driving the carbonic acid off from the carbonate of lime or of initially mixing the carbonate of lime with the other cement materials and fuel we may effect the fusion or melting of the cement materials in an area or zone of the furnace wherein a pressure considerably above that of the atmosphere is maintained—say a pressure of from fifteen to twenty pounds per square inch above the atmosphere—such pressure being primarily due to the air-blast and maintained, according to one way of practicing our process, by the resistance which the column of materials and fuel in the furnace opposes to the passage through it of the products of combustion. We may conveniently attain this end by making the height of the furnace such that with the blast-pressure employed the desired pressure may be maintained in the lower region or zone of the furnace where the highest temperature exists. If the carbonate of lime of the raw materials has been introduced without preliminary calcination, as it descends in the furnace, and so gets raised in temperature, its carbonic acid will be liberated and passing through the superimposed fuel will be more or less carbonized to carbonic oxid. Should the conditions be such that there is not a sufficiently complete carbonization of the carbonic acid and it is desired to utilize the carbonic oxid produced in the furnace, the gases may be passed through incandescent coal or coke. Ordinary producers, such as are used for the production of water-gas, may be utilized for this purpose and an extremely rich producer-gas thus obtained which may then be efficiently burned for the heating of the blast, the raising of steam, or for other useful purpose.

Where the carbonate of lime is to be preliminarily calcined, all of the carbonic oxid and other products of combustion from the furnace may be passed through the carbonate of lime in the calcining chamber or furnace and there burned, air being introduced to support such combustion of the gases, and substantially all of the heat of said products of combustion be utilized in driving off carbonic acid from the carbonate of lime of the raw materials and heating the resultant lime with or without the other raw ingredients, the calcining-chamber being made of such height or dimensions as to lend itself economically to this operation, or a part only of the carbonic oxid may be utilized for preliminarily calcining the carbonate of lime and the residue be diverted and burned for raising steam and heating the blast.

Another mode of practicing our invention according to the plan of melting the cement materials in the presence of a high pressure is to maintain the pressure within the furnace by throttling the outlet of the products of combustion, as by means of a loaded valve or an adjustable valve or plug, and in this case we may preliminarily calcine the carbonate of lime by utilizing the carbonic oxid from the furnace in whole or in part, and where but a part of it is employed for this purpose the residue may be diverted and burned for raising steam and heating the blast.

Where we maintain the desired high pressure in the furnace by checking the egress of the products of combustion, as above suggested, we may with proper regulation of blast-pressure and egress of products of combustion maintain any high pressure that may be desired for the purposes of the operation, and when operating in this way we are enabled to practice our invention according to another plan or mode of operation, which is as follows:

When carbonate of lime is heated to a temperature of about 1,000° Fahrenheit, its contained carbonic acid is given off as gas, the remaining solid being caustic lime. If, however, the carbonate of lime be heated in a vessel in which a constant pressure materially in excess of that of the atmosphere is maintained, the carbonate of lime will fuse and run, and if the source of heat be then withdrawn and the vessel and contents allowed to cool the carbonate of lime will be found as a stone-like substance of the form of the interior of the vessel. If, however, when the carbonate of lime is fused the source of heat be not withdrawn, but the heating continued, a temperature will be attained at which the liquid carbonate of lime gives off its carbonic acid, the temperature at which this occurs being dependent on the pressure in the vessel, and if the carbonic acid be drawn off as produced, so that the pressure does not increase, the carbonate of lime may be thus entirely calcined. As by the combustion of the fuel, aided by a heated blast and the high pressure of from twenty to thirty-five pounds per square inch, a temperature of from 3,500° to 4,000° Fahrenheit may be maintained in the hottest zone of the furnace while constantly removing the carbonic acid from the zone in which it is produced along with the products of combustion, we may eliminate all or substantially all the carbonic acid from the carbonate of lime.

The furnace having been charged with the raw cement materials (the carbonate of lime of which has not been calcined) mixed with the fuel when the liquid carbonate of lime gives up its carbonic acid in the manner above described, the resulting caustic lime is in immediate proximity to the silica and alumina of the argillaceous ingredients, all having been raised to such temperature as to cause the chemical union of the lime with the silica and alumina directly the carbonate of lime is freed from its carbonic acid. In this way the basic and acid ingredients are brought together in a manner most favorable to mutual fluxing and the fusion of the product is correspondingly facilitated. In practicing this mode of operation it will be seen that the carbonic acid is given off from the carbonate of lime at a zone in the furnace which is overlaid with a thick bed of incandescent fuel, and the passage of the carbonic-acid gas through this incandescent carbon is sufficient to carbonize the gas to carbonic oxid, and thus a rich combustible gas is produced by the furnace for utilization for the purposes previously mentioned.

Under all the conditions or in all the ways of practicing our process the cement materials will be melted at a high temperature and in contact with the fuel. According to the conditions of the operation a sufficient quantity of fuel will be mixed with the cement materials to effect the results hereinbefore stated, and when a fuel containing ash is used the quantities of the respective cement materials will, or should be, proportioned to the amount of fuel employed, as is well understood—that is to say, sufficient lime should always be supplied to combine with the silica and alumina of the ash, so that the qualtity of the resultant cement will be in no way impaired by the production of ash from the fuel in the progress of the operation.

Where a pressure materially above that of the atmosphere is maintained in the melting zone or region of the furnace, the pyrometric value or intensity of the heat due to the combustion of the fuel is considerably greater than where combustion of such fuel occurs in the presence of a pressure equal to that of the atmosphere, or thereabout, and it is thus possible to obtain an extremely high temperature without the necessity of heating the blast immoderately, and the fluxing and fusing of the comparatively refractory cement materials may be economically and rapidly accomplished by the maintenance of a proper blast and pressure and the use of a suitable quantity of fuel. Where the egress of the products of combustion is unobstructed at the top of the furnace, a sufficient pressure may readily be maintained, as before suggested, by regulating the height of the column of material in the furnace. It would be entirely feasible to in this way maintain with fair regularity in the melting zone a pressure of from ten to twenty pounds per square inch above the atmosphere, the temperature and pressure gradually falling as the top of the column is approached where the gases or products of combustion may leave the furnace substantially at, or at least very little above, atmospheric pressure. When operating in this way, the carbonic acid will be eliminated above the zone of highest pressure and temperature and no fusion of the carbonate of lime will occur. The height of the column of material required to maintain in the zone of fusion a desired pressure will of course depend upon the size and nature of the pieces of fuel and cement material. When the same are in small pieces, and especially if one of the materials be of a clayey nature, a pressure of from ten to fifteen pounds per square inch may be retained in the fusion zone by a superimposed column of material of from sixty to eighty feet in height. Where, however, the outlet for the products of combustion is so regulated as to maintain a considerable pressure at the outlet and a furnace of less height is employed, as in the last plan above described of practicing our invention, the differences in pressure and temperature between the upper end of the furnace and the lower part or the zone of fusion would be less; but, as above stated, the temperature and conditions would be such that the carbonic acid would not only be eliminated from the carbonate of lime but would also in the presence of the highly-incandescent fuel be converted into carbonic oxid.

In the accompanying drawings, Figure 1 is an elevation with the furnace in section, somewhat diagrammatic in character, illustrating one organization for practicing our process. Fig. 2 is a vertical section showing the upper part of a furnace of a somewhat different construction, the lower part of which, as well as the apparatus associated with it, may be as shown in Fig. 1; Fig. 3, a vertical section showing the upper part of another construction of furnace for practicing our invention, the lower part of which may be the same as is illustrated in Fig. 1. Fig. 4 is a vertical section showing the upper part of still another construction of furnace, the lower portion of which may also be of the construction illustrated in Fig. 1.

Fig. 1 shows a furnace analogous in construction to an ordinary blast-furnace. It consists substantially of a vertical stack composed of an exterior iron shell A and a lining of refractory material B. At the top there are an outlet C for the products of combustion, a charging-platform, and a feeding-bell D, normally closing the top of the furnace. E is the hearth and crucible, having an upper tap-hole $e$ and a lower tap-hole $e'$. $f$ represents twyers connected with a common blast-pipe F, connected with the stove and blowing-engine. Of course the tap-holes $e$ and $e'$ may be normally closed by plugs, the molten material to be drawn off at intervals. The molten material from the upper tap-hole e may be run into a car G, where it is subjected to spray of water from the nozzle g, which effects its cooling and disintegration. The car may be drawn up the inclined platform or track by the engine H and the cooled disintegrated cement material dumped into the hopper I, which may deliver it to the grinding-mill K.

Fig. 2 shows the top of the furnace modified as follows: Axially above the top of the stack is a chamber L, to which the cement material is delivered from the charging-platform and which may not have any bell or closing device. At the point where the top of the furnace is contracted and merges into the vertical chamber L there is a lateral chamber or bifurcation M, which may be normally closed at the top by a bell M'. The fuel is fed as required to the chamber M and mixes with the cement material at the top of the main stack or body of the furnace, at or about which point there are one or more twyers or air-blast inlets $g'$, connected with the air-blast pipe F. The mixed carbonic oxid and air burned in the chamber L effects the disassociation of carbonic acid from the carbonate of lime. In either of these constructions the furnace-stack should be of appropriate height, as hereinbefore suggested.

In Fig. 3 the top of the furnace is normally closed by a bell D, as in Fig. 1, and the outlet C for the products of combustion leads into an inclosed chamber c, its outlet being formed for a valve-seat coöperating with a fire-clay valve $c'$ on a vertical stem $c^2$, passing through a bushing in the chamber and weighted, as indicated at $c^3$. The pipe $c^4$ conducts the products of combustion or carbonic oxid from the chamber c to the stove and boiler direct, the construction here illustrated providing for the preliminary calcination of the carbonate of lime, as follows: A pipe O, connected with the pipe $c^4$, is provided with a suitable cock or valve o and connected with one or more nozzles $o'$, entering a vertical roasting or calcining chamber P at or near its bottom and above the removable grate-bars P', below which is an open chute $P^2$ for directing the contents of the chamber P into the top of the furnace-stack. The carbonic oxid diverted through the pipe O is burned in P, air being supplied through the grate-bars, and the contained cement material is roasted or calcined to eliminate the carbonic acid.

In Fig. 4 the construction is in all respects the same as in Fig. 3, except that the parts O P, &c., are omitted, it being contemplated that according to the last way described of practicing our process the cement materials will be introduced directly into the furnace without preliminary calcination of the carbonate of lime. The blast may be stopped when the bell is to be lowered and material fed to the furnace.

We have spoken of the fused cement materials or cement clinker being cooled and disintegrated and have illustrated in Fig. 1 a way in which this may be done. Of course the cooling may be effected in any suitable way and merely by exposure to the atmosphere. The clinker is of course to be pulverized to produce Portland cement, and the grinding or pulverizing may be effected in any suitable way. To facilitate pulverization, we prefer to break up the cooled or solidified clinker. This may be accomplished by a spray of water, as indicated in the drawings, or a solidified mass of cement clinker may be broken up in any way desired, as by crushing rolls, jaws, or stamps, and then delivered to pulverizers.

We have shown and described a vertical furnace fired with coal or coke; but it is apparent that other forms of furnaces and fuels may be used without departing from the spirit of the invention.

We claim as our invention—

1. The process of making Portland cement consisting of fusing the cement materials to a liquid mass under a pressure greater than that of the atmosphere, cooling the molten mass and pulverizing it.

2. The process of making Portland cement consisting of melting to a liquid the cement materials in a reducing atmosphere under a pressure greater than that of the atmosphere, cooling the molten mass and pulverizing it.

3. The process of making Portland cement consisting in melting the cement materials in a reducing atmosphere, at the same time reducing iron oxid contained in the cement materials to the form of metallic iron, permitting the metallic iron to separate from the molten cement materials, drawing off the molten cement product so depleted of iron, cooling and pulverizing it.

4. The process of making Portland cement consisting in melting the cement materials in a reducing atmosphere under pressure, at the same time reducing iron oxid contained in the cement materials to the form of metallic iron, permitting the metallic iron to separate from the molten cement materials, drawing off the molten cement product so depleted of iron, cooling and pulverizing it.

5. The process of making Portland cement which consists in mixing the cement material with carbonaceous fuel, melting the cement materials by the combustion of said fuel supported by an air-blast at a pressure materially in excess of the pressure of the atmosphere, cooling the molten mass and pulverizing it.

6. The process of making Portland cement consisting of preliminarily calcining the carbonate of lime to eliminate carbonic acid, then mixing carbonaceous fuel with the cement materials, then maintaining the combustion of the fuel by an air-blast under pressure and thereby melting the cement materials in a reducing atmosphere, drawing off the molten cement product, cooling and pulverizing it.

7. The process of making Portland cement consisting of preliminarily calcining the carbonate of lime to eliminate carbonic acid, then mixing carbonaceous fuel with the cement materials, then maintaining the combustion of the fuel by an air-blast under pressure and thereby melting the cement materials in a reducing atmosphere at a pressure materially greater than that of the atmosphere, drawing off the molten cement material, cooling and pulverizing it.

8. The process of making Portland cement consisting of preliminarily calcining the carbonate of lime to eliminate carbonic acid, then mixing carbonaceous fuel with the cement materials, then maintaining the combustion of the fuel by an air-blast under pressure and thereby melting the cement materials at a pressure materially greater than that of the atmosphere, drawing off the molten cement material, cooling and pulverizing it.

9. The process of making Portland cement consisting of mixing the cement materials with coal or coke, maintaining the combustion of such fuel by an air-blast, maintaining a pressure in the presence of the cement materials and fuel and adjacent to the air-blast of from ten to twenty pounds per square inch above the atmosphere, thereby melting the cement material in an area or zone of high pressure, drawing off the molten cement material, cooling and disintegrating it and pulverizing it.

10. The process of making Portland cement consisting of mixing carbonate of lime, argillaceous matter containing silica and alumina, and coal or coke, maintaining the combustion of such fuel under high temperature and pressure by means of an air-blast, thereby disassociating carbonic acid from the carbonate of lime, causing the conversion of the carbonic acid into carbonic oxid in the presence of the highly-incandescent fuel, and also thereby melting the cement materials, drawing off the molten cement material and cooling and pulverizing it.

11. The process of making Portland cement consisting of mixing carbonate of lime, argillaceous matter containing silica and alumina, and coal or coke, maintaining the combustion of such fuel under high temperature, and a pressure of from ten to twenty pounds above the atmosphere by means of a high-pressure air-blast, thereby disassociating carbonic acid from the carbonate of lime, causing the conversion of the carbonic acid into carbonic oxid in the presence of the highly-incandescent fuel, and also thereby melting the cement materials, drawing off the molten cement material, cooling and pulverizing it.

12. The process of making Portland cement consisting of first fusing carbonate of lime at a pressure greater than that of the atmosphere, then driving off the carbonic acid of the fused carbonate of lime by further heating in the presence of silica and alumina, fusing the silicates and aluminates of lime so produced, cooling the molten mass and pulverizing it.

13. The process of making Portland cement from raw material containing carbonate of lime, silica and alumina, consisting in disassociating carbonic acid from the carbonate of lime by heat, heating the cement materials to produce the requisite reactions or combinations, and converting the carbonic acid into carbonic oxid by contact with the incandescent carbon.

14. The process of making Portland cement from raw materials containing carbonate of lime, silica and alumina, consisting in disassociating carbonic acid from the carbonate of lime by heat, heating the cement materials by the aid of an air-blast to produce the requisite reactions or combinations, converting the carbonic acid into carbonic oxid by contact with incandescent carbon, and burning the carbonic oxid to heat the air-blast or effect the driving of the blower.

15. The process of making Portland cement from raw materials containing carbonate of lime, silica and alumina, consisting in melting the cement materials (lime, silica and alumina) and disassociating carbonic acid from the carbonate of lime employed by the heat from the waste gases or products of combustion of the melting operation.

In testimony whereof we have hereunto subscribed our names.

EDWARD HENRY HURRY.
  HARRY JOHN SEAMAN.

Witnesses:
  GEO. A. MERKEL,
  H. B. YINGLING.